(12) United States Patent
Wietlisbach et al.

(10) Patent No.: US 7,831,636 B2
(45) Date of Patent: Nov. 9, 2010

(54) TECHNIQUE FOR THE MIGRATION OF A HOST ENVIRONMENT TO A NEW SYSTEM PLATFORM

(75) Inventors: Markus Wietlisbach, Zollikerberg (CH); Hansbeat Loacker, Egg (CH)

(73) Assignee: UBS AG, Zurich (CH)

( * ) Notice: Subject to any disclaimer, the term of this patent is extended or adjusted under 35 U.S.C. 154(b) by 191 days.

(21) Appl. No.: 11/282,700

(22) Filed: Nov. 21, 2005

(65) Prior Publication Data

US 2007/0011209 A1 Jan. 11, 2007

(30) Foreign Application Priority Data

Jul. 6, 2005 (EP) .................................. 05014661

(51) Int. Cl.
G06F 17/00 (2006.01)
G06F 7/00 (2006.01)
(52) U.S. Cl. .................. 707/803; 707/809; 707/944
(58) Field of Classification Search ............. 707/104.1, 707/101, 803, 809, 944, 999.101
See application file for complete search history.

(56) References Cited

U.S. PATENT DOCUMENTS

| | | | | |
|---|---|---|---|---|
| 5,333,303 | A * | 7/1994 | Mohan | 714/20 |
| 7,146,356 | B2 * | 12/2006 | Choi et al. | 707/3 |
| 7,296,024 | B2 * | 11/2007 | Beary | 1/1 |
| 7,730,171 | B2 * | 6/2010 | Frazier et al. | 709/223 |
| 2003/0187816 | A1 * | 10/2003 | Jardin | 707/1 |
| 2004/0122865 | A1 * | 6/2004 | Stahl et al. | 707/104.1 |
| 2006/0074916 | A1 * | 4/2006 | Beary | 707/10 |
| 2006/0222160 | A1 * | 10/2006 | Bank et al. | 379/221.08 |
| 2006/0222161 | A1 * | 10/2006 | Bank et al. | 379/221.08 |
| 2006/0222162 | A1 * | 10/2006 | Bank et al. | 379/221.08 |
| 2006/0222163 | A1 * | 10/2006 | Bank et al. | 379/221.08 |
| 2007/0027904 | A1 * | 2/2007 | Chow et al. | 707/102 |
| 2007/0121850 | A1 * | 5/2007 | Klos et al. | 379/114.28 |

FOREIGN PATENT DOCUMENTS

WO WO 98/25376 A 6/1998

OTHER PUBLICATIONS

Konstantas, Migration of Legacy Applications to a Corba Platform: A Case Study, 1996, pp. 100-112.*

Henrard (Inverse Wrappers for Legacy Information Systems Migration, 2004, pp. 30-43).*

(Continued)

Primary Examiner—Luke S Wassum

(57) ABSTRACT

A method for configuring a transaction-based host environment for migration to a new system platform is described. The method comprises the steps of providing at least one database of a first type and at least one database of a second type, which have different migration behaviour, on the previous system platform. Further provided is a first type of transaction which accesses both the first type of database and the second type of database on the previous system platform. For preparing the migration, the first type of transaction is replaced in the host environment by a second type of transaction and a third type of transaction, wherein the second type of transaction accesses only the first type of database and the third type of transaction only the second type of database. The method additionally comprises initiating transactions of the second and third type on request for a transaction of the first type from a decentralised environment.

18 Claims, 8 Drawing Sheets

OTHER PUBLICATIONS

Brodie (DARWIN: On the Incremental Migration of Legacy Information Systems, 1994, pp. 1-55).*

Anonymous: "Transaction System Migration" Internet Article, [Online] Jun. 5, 2002, Seiten 1-6, XP002366547 Gefunden im Internet: URL:http://www.legacyj.com/whitepapers/LegacyJ_TransactionMigration_Whitepapr.pdf > [gefunden am Feb. 6, 2005] das ganze Dokument.

Hudicka J: An Overview of Data Migration Technology, Internet Article, [Online] Apr. 1998, Seiten 1-3, XP002366548, Gefunden im Internet: URL:http://www.dulcian.com/magazine%articles/An%20overview%20of%20Data%20Migration%20Methodology.htm> [gefunden am Feb. 6, 2006] das ganze Dokument International Search Report Dated Aug. 4, 2006.

Anonymous: "*Transaction System Migration*"; Internet Article, {online} Jun. 5, 2002, pp. 1-6, XP002366547; retrieved from the internet: URL:http://www.legacyj.com/whitepapers/Legacyj_TransactionMigration_Whitepaper.pdf> [retrieved on Feb. 6, 2005].

Hudicka, J.: "*An Overview of Data Migration Technology*"; internet article, {on line} Apr. 1998, pp. 1-3, XP002366548, retrieved from the internet: URL:http://www.dulcian.com/magazine%20articles/An%200verview%20of%20Data%20Migration%20Methodology.htm> [retrieved on Feb. 6, 2006].

Search Report from corresponding Singapore applicaiton No. 200719115-8 completed Nov. 27, 2008 by M. Emami of the Australian Patent Office.

* cited by examiner

500

| TRX1 | TRX2 | TRX3 | TRX4 |
|------|------|------------|------|
| 1001 | 2001 | 3001, 3002 | - |
| 1002 | 2002 | - | 4002 |
| 1003 |      | - | - |

200

TECHNIQUE FOR THE MIGRATION OF A HOST ENVIRONMENT TO A NEW SYSTEM PLATFORM

FIELD OF THE INVENTION

The invention relates to the field of system migration. More specifically, the invention relates to the configuration of a transaction-based host environment for migration to a new system platform.

BACKGROUND OF THE INVENTION

Modern computer systems in large companies are frequently configured as OLTP systems. OLTP (on-line transaction processing) designates an approach to transaction-based data processing.

In this context a transaction is understood as a series of logically cohesive (frequently database-related) individual actions combined into an indivisible unit. A characteristic of a transaction is that the individual actions combined in it are conducted either in their entirety or not at all. Furthermore, several transactions can be conducted in parallel without causing interactions among them. Each individual transaction therefore runs in "isolation" from the other transactions.

Building on the transaction paradigm, common properties emerge for OLTP systems. One of these common properties is the fact that OLTP systems are shareable. Within the scope of shareable operation a multiplicity of parallel transactions can be generated by different users. OLTP systems are configured in such a way that the transactions (at least in the perception of users) run in real time. Additionally, the transactions are normally typified, i.e. each OLTP system usually provides a series of pre-defined types of transaction for different uses (and with different effects at database level).

Conventional OLTP systems are normally distributed systems in which several client components (or simply "clients") communicate with at least one host component (or simply "host"). The term component here designates both hardware implementations and software realisations or combinations of hardware and software.

Communication between host and client normally takes place via a network like the Internet or an intranet. The clients request certain services from a host via the network and wait for a response. The host accepts the requests, processes the requests and sends appropriate responses back to the clients. Further components may be arranged between the host and the clients for formatting requests, authenticating clients, etc.

A host normally comprises several individual sub-components (such as transaction-specific application programs, one or more databases and corresponding interfaces), which run on a common system platform. A system platform is understood to be a combination of a certain type of computer and the associated operating system. The host sub-components together with the system platform form a host environment. In many cases there is access to the host environment from a decentralised environment. A decentralised environment of this kind is formed, for example, from the clients distributed over the network in their various forms. In the case of a large bank the various client forms comprise customer terminals, cash machines, customer care terminals, E-banking solutions, etc.

Owing to the rapid progress in the field of information technology and owing to the fact that many existing OLTP systems have already been in operation for a long time, from today's point of view numerous host environments are based on obsolete system platforms. Therefore thought is currently being given to ways in which the host environments, which over the years have become extremely complex systems, can be reliably migrated to new and technologically up-to-date system platforms.

All kinds of problems occur with migrations of this kind. In particular, frequently not all host sub-components can or should be migrated unchanged to the new system platform. In the case of databases the migration is usually also accompanied by changes in content, as information needs change and in general increase. It is also desirable to be able to perform the migration step by step, so that the host environment remains at least partially operable in the event of unexpected problems. Additionally there is frequently a need not to allow the decentralised environment to notice anything of the migration of the host environment.

The invention is based on the object of providing an efficient approach to the migration of a host environment to a new system platform.

SUMMARY OF THE INVENTION

According to a first aspect of the invention this object is achieved by a method for configuring a transaction-based host environment which is accessed from a decentralised environment, for the migration from a previous system platform to a new system platform, which differs from the previous system platform, for example in respect of the operating system used and/or the type of computer used. The method comprises the steps of providing at least one database of a first type on the previous system platform, wherein the first type of database is migrated to the new system platform with its content unchanged and/or with an unchanged logical data model or else not at all, providing at least one database of a second type on the previous system platform, wherein the second type of database is transformed into a third type of database changed in content and/or with a changed logical data model on migration to the new system platform, replacing a first type of transaction, which on the previous system platform accessed both the first type of database and the second type of database, in the host environment by a second type of transaction and a third type of transaction, wherein the second type of transaction accesses the first and not the second type of database and the third type of transaction accesses the second and not the first type of database, and initiating transactions of the second and third type when a transaction of the first type is requested in the decentralised environment.

A host environment configured according to this method can be migrated to a new system platform step by step, without resulting in major effects on the decentralised environment and in particular on the clients accessing the host environment from the decentralised environment. The approach according to the invention further allows efficient migration of host environments with databases of different migration behaviour and associated applications. An application is here understood as an application program (usually with database access) which provides the processing functionalities on which a certain transaction is based (e.g. for banking).

By means of the method according to the invention a host environment can be configured in such a way that at the beginning of the migration phase there are no longer any types of transaction which access databases with different migration behaviour within the scope of a transaction. This approach allows the types of database to be migrated individually and if necessary independently of one another. This is primarily enabled by replacing the first type of transaction in the host environment by the second and third type of transaction. If a transaction of the first type is then requested in the decentralised environment, transactions of the second and third type are automatically initiated (e.g. by an interoperable transaction control component), which have the same effects in the host environment on the previous system platform and deliver the same results as if the requested transaction of the first type had been conducted.

It has proved advantageous to generate an allocation between a requested transaction of the first type and in each case one thereupon initiated transaction of the second and the third (and/or a fourth) type. An allocation of this kind can be done in table form and, after conducting the transactions (e.g. of the second and third type in the host environment) allows the transaction of the first type initiating these transactions to be determined. Determination of this kind is advantageous if the results of transactions of the second and third (and/or a fourth) type allocated to one another (and to a transaction of the first type) are passed from the host environment to the decentralised environment. Within the scope of this transfer these results can then be converted into a pre-defined result format, possibly of the requested transaction of the first type, and further processed in this format in the decentralised environment (e.g. by the clients).

If, for instance, the transaction of the first type has been requested by a client in the decentralised environment, the converted result can be passed to the requesting client. The client consequently has the impression that the transaction of the first type has taken place in the host environment in the conventional way. The client does not need to have any knowledge of the actual processing in the host environment and in particular of the transactions of the second and the third or fourth type conducted. In other words the client does not "see" any of the preparation of the host environment for the migration or of the current migration status of the host environment. The individual components of the decentralised environment can further retain their customary message and communication format during the entire migration phase.

At least one of the above-explained steps of generating the allocation, receiving results and converting the results can be conducted in the decentralised environment. One or more of these steps can, however, also run in the host environment.

Advantageously a central transaction control component is provided, arranged functionally between the individual clients and one or more hosts. The transaction control component may possess further functionalities in addition to the already explained capabilities (such as authentication or checking the authorisation of clients or formatting the client data submitted with a request or the data returned to the requesting client). The transaction control component may be located in the decentralised environment or in the host environment. It is further conceivable to construct the transaction control component as a distributed component, which is partially located in the decentralised environment and partially in the host environment. The association of the transaction control component with the decentralised and/or host environment can be determined by the association with the host network and/or the decentralised network.

According to a further variation of the above-explained method, the step of taking into operation at least one database of the third type of database which has arisen from the second type of database is provided on the new system platform. Databases of the third type of database possibly possess in terms of content certain common features with databases of the second type of database on the old system platform, but compared with these databases of the second type of database are modified in content or in respect of the logical data model (in other words have, for example, a differing logical data structure, additional data fields, etc.)

After a database of the third type has been taken into operation on the new system platform, a requested transaction of the first type can be fanned out towards both platforms. This fanning out can be done, for example, in such a way that a requested transaction of the first type is divided into an allocated transaction of the second type on the previous system platform and into an allocated transaction of a fourth type accessing the third type of database on the new system platform. The fanning out involves individual or all the transactions of the third type (irrespective of whether they have already been requested from the decentralised environment or have been obtained only by conversion of a transaction of the first type requested from the decentralised environment) being replaced by transactions of the fourth type.

Fanning out of the requested transaction of the first type may already take place in the decentralised environment or else initially in the host environment. The above-explained steps of generating the allocation, receiving results and converting the results may further also comprise transactions of the fourth type.

Even after a database of the third type of database has been taken into operation on the new system platform, the corresponding database of the second type of database can still be accessed in context with transactions of the third type. Accordingly, both transactions of the third type and "sister transactions" of the fourth type can be conducted during a transition phase (for example during the entity-by-entity migration described below). To maintain the data consistency it may be considered to conduct in each case only either an allocated transaction of the third type or else an allocated transaction of the fourth type for a certain transaction of the first (or third) type requested from the decentralised environment in the host environment. The decision as to whether an allocated transaction of the third type or of the fourth type should be conducted in the host environment for a transaction of the first (or third) type requested from the decentralised environment can be made on an entity basis.

According to a variant of the invention (at least in a test environment) one or more databases of the second type are administered on the old system platform and one or more databases of the third type on the new system platform by parallel transactions of the third and fourth type. According to this scenario there is a parallel transaction of the fourth type for every transaction of the third type during transitional operation. By comparing corresponding database contents of parallel administered databases of the second and third type, the mode of functioning of the new system platform (and applications and databases running on it) can be checked. Switching off components such as applications and databases on the old system platform and taking components into operation on the new system platform can take place dependent on the result of this comparison. If no inconsistencies between the contents of parallel administered databases of the second and third type have been observed over and beyond a fairly long period of time, successful migration in respect of the databases of the third type (and the applications accessing them) can be assumed.

Subsequent to successful taking into operation of databases of the third type on the new system platform, taking into operation at least one database of a fourth type of database which has arisen from the first type of database (e.g. by at least largely automated translation) can follow on the new system platform. Naturally the fourth type of database could also be taken into operation on the new system platform before or at the same time as the third type of database.

Within the scope of taking into operation one or more databases of the fourth type of database, one or more applications accessing the fourth type of database can additionally be taken into operation on the new system platform. If the databases of the fourth type of database have arisen from the first type of database without substantial changes, the applications for the new system platform can be generated by code translation of the previous applications running on the old system platform and there accessing databases of the first type of database. In other words, these applications do not necessarily have to be rewritten for the new system platform (one reason being that, owing to the structural common features of the databases of the first and fourth type, the database access mechanisms can usually be retained).

According to a further variation of the invention, several parallel hosts with similar transaction functionalities are operated on the previous system platform. A procedure of this kind can be chosen to improve the scalability of the host environment. Identical databases and identical applications can run on each individual one of the hosts. If a plurality of parallel hosts is provided, there is frequently a control component present which assigns individual transactions to individual hosts. Assignment of this kind can run dynamically, for example, in order to utilise the individual hosts evenly (load balancing). Assignment can also be done statically, however. Static assignment can be based, for example, on the fact that a subset consisting of a pre-defined entity set is allocated to each host. An entity here designates an allocation criterion for data sets. The transactions may have an entity relationship and therefore relate to data sets allocated to individual entities.

The transaction-based functionalities of the plurality of parallel hosts on the previous system platform is taken over on the new system platform preferably by a single logical host. It would, however, also be conceivable likewise to provide several parallel hosts on the new system platform.

Although the migration can be done ad hoc, a step-by-step course of migration is preferred. This means the migration can be conducted host by host in the event of a plurality of parallel hosts. Conducting the migration tranche by tranche (in other words, for example, entity by entity), is also possible. In the event of entity-by-entity migration it is advantageous to ascertain the migration status of the individual entities so that the transactions can run on the correct system platform.

A preferred approach to entity-by-entity migration comprises the steps of determining the entity allocated to a requested transaction of the first (or third) type, determining the migration status of the allocated entity and conducting a transaction of the third type on the previous system platform or a transaction of the fourth type on the new system platform as a function of the migration status of the allocated entity. The migration status of individual entities can be registered in the form of a table, for example. It is advantageous to conduct the steps of determining the entity allocated to a transaction and the migration status of this entity in the decentralised environment.

According to a further aspect of the invention, a computer program product with program code portions, such as computer executable instructions, for conducting the steps according to the invention when the computer program product is run on one or more computers is provided. Each of the one or more computers can include, for example, memory (e.g., random access memory (RAM)) for storing computer executable instructions, and a processing unit (e.g., one or more computer processors) for accessing memory and executing computer executable instructions. The computer program product may be stored on a computer-readable data carrier. Alternatively, the computer program product can be stored on a computer readable medium. The computer readable medium can be implemented as memory (volatile or non-volatile), but cannot be implemented as pure energy (e.g., a carrier wave).

BRIEF DESCRIPTION OF THE DRAWINGS

Further advantages and variations of the invention emerge from the following description of preferred embodiments and from the figures.

DESCRIPTION OF PREFERRED EMBODIMENTS

Figure 1:
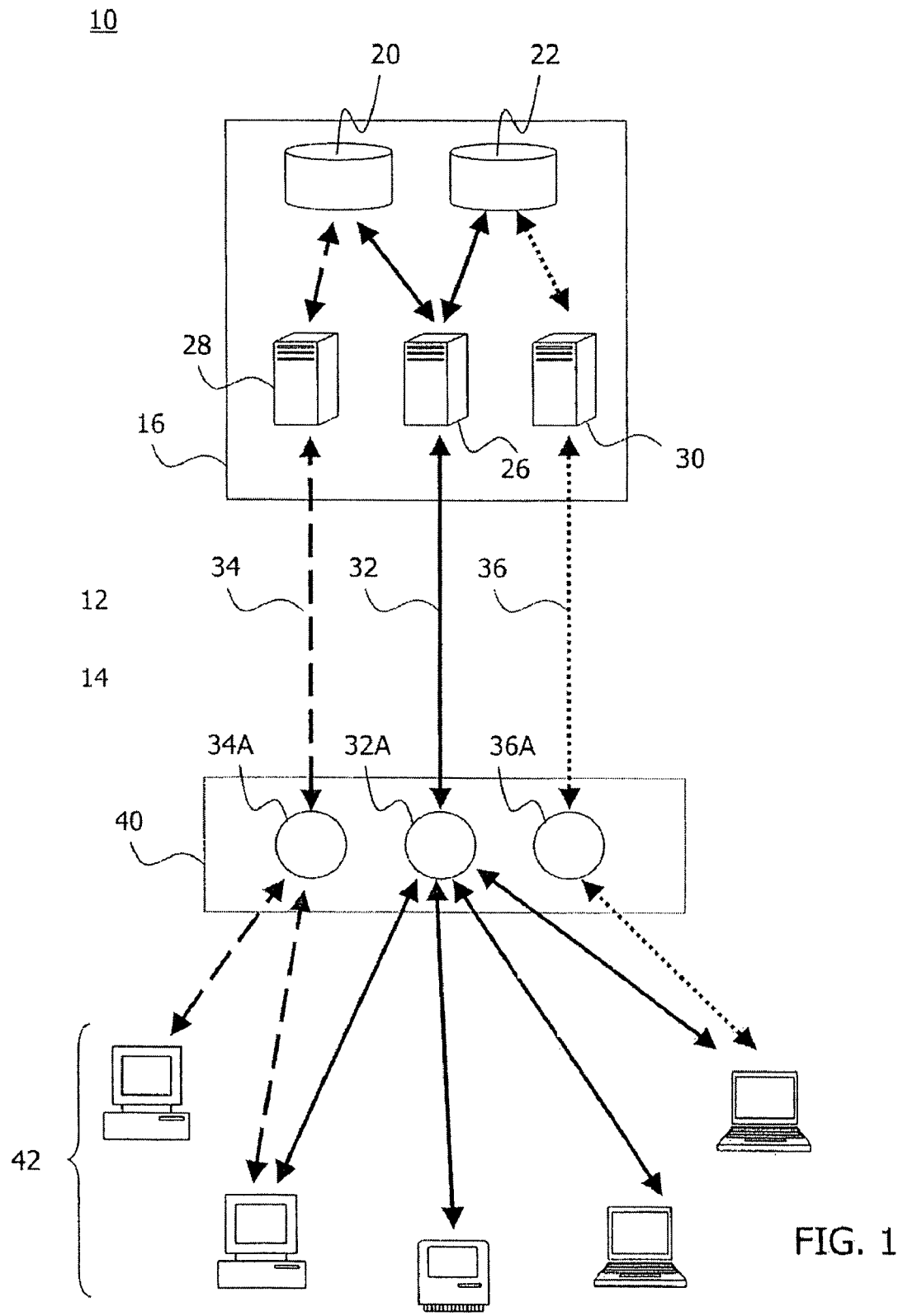
FIG. 1 shows a schematic illustration of a first OLTP system according to the invention before configuration for migration to a new system platform.

FIG. 1 shows an OLTP system 10 which is to be configured for migration to a new system platform. The OLTP system 10 comprises a host environment 12 and a decentralised environment 14. The host environment 12 and the decentralised environment 14 are coupled by means of a network (not shown).

In the host environment 12, a host 16 is shown which runs on a predefined system platform (e.g. on a Unisys platform, not shown). The host 16 comprises a plurality of individual sub-components such as databases and applications with database access. More precisely, the host 16 comprises a first database 20 of a type which is to be migrated to the new system platform unchanged in content and in respect of the logical data model (or in an alternative embodiment not at all), and a second database 22 of a type which is modified in content and in respect of the logical data model on migration to the new system platform.

The host 16 additionally comprises three separate types of application 26, 28, 30, which differ mainly in their database access mechanisms. Each type of application 26, 28, 30 may comprise several different individual applications. The first type of application 26 accesses both the first database 20 and the second database 20. The second type of application 28 accesses only the first database 20 and the third type of application 30 accesses only the second database 22.

Different types of transaction 32, 34, 36 are linked to the three types of application 26, 28, 30. The first type of application 26 belongs to a first type of transaction 32 to be replaced (indicated by solid arrows), which reads out and/or modifies contents from both the first database 20 and the second database 22. The first type of transaction 32 to be replaced can be characterised in that it has different access behaviour in respect of the two databases 20, 22. The first type of transaction 32 could thus contain one or more read-only accesses in respect of the first database 20 and one or more write-only accesses in respect of the second database 22 (or vice versa). A transaction type 32 of this kind can be replaced particularly easily and with the guarantee of a high data consistency in the run-up to the actual migration. In an alternative embodiment the first type of transaction 32 comprises combined read/write accesses in respect of each of the two databases 20, 22.

The second type of application 28 belongs to a second type of transaction 34 (indicated by broken-line arrows), which reads out and/or modifies contents of the first database 20 only. Finally, the third type of application 30 is part of a third type of transaction 36 (indicated by dotted arrows), which reads out and/or modifies contents of the second database 22 only.

The decentralised environment 14 illustrated in FIG. 1 is based, for example, on a UNIX platform. The decentralised environment 14 comprises a central control component 40 (in the form of a terminal controller) and a multiplicity of extremely varied terminals or clients 42, which communicate with the host environment 12 via the control component 40. The clients 42 are, for example, PCs, customer terminals, cash machines, mobile telephones with an appropriate functionality and similar terminals. Although not illustrated, decentralised applications which likewise communicate with the host environment 12 through switching by the control component 40 may additionally be located in the decentralised environment 14. Decentralised applications of this kind have real-time access to the databases 20, 22 via the control component 40.

The control component 40 has for each of the three types of transaction 32, 34, 36 an allocated transaction control mechanism 32A, 34A, 36A, indicated in FIG. 1 in each case by a circle. The transaction control mechanisms 32A, 34A, 36A serve substantially as switching centres which conduct transactions requested by the clients 42 depending on the type of transaction to the corresponding type of application (and to the application specifically responsible for processing the transaction). The transaction control mechanisms 32A, 34A, 36A may additionally take on further tasks, such as formatting tasks (in other words, for example, converting a client request into a host-specific format or a host response into a client-specific format). Formatting steps of this kind are advantageous above all in heterogeneous decentralised environments 14 with different types of client.

Figures 2, 5:
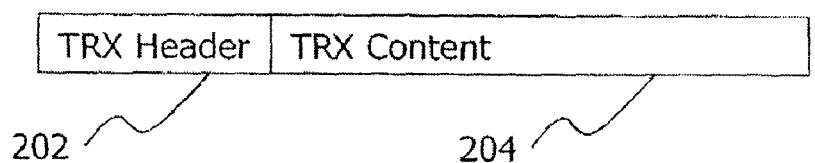
FIG. 2 shows a schematic illustration of a transaction message exchanged between a host and a control component of the OLTP system.
FIG. 5 shows an allocation table of a transaction control component of the OLTP system.

Communication between the control component 40 and the host 16 is done by transaction messages 200, as illustrated in FIG. 2. Each transaction message 200 comprises a transaction header 202 and transaction content 204. The header 202 contains a unique transaction number (e.g. 1001). The transaction content 204 of each transaction message 200 contains an indication of the object of the database concerned in the transaction. An indication of this kind of the object of the database has in the example case the following format: xxx-yyyyy.zz, with xxx (e.g. 032) designating a group of entities, yyyyy (e.g. 12345) standing for an individual entity from the group of entities and xx (e.g. 01) characterising a specific object for this entity. The entity group may be the branch of a company, the entity a customer of the branch and the object a data set created for this customer.

On request from a client, the control component 40 first converts the client request into the format of a transaction message 200 and then forwards the formatted request to the host 16 (more precisely to the responsible application). The host 16 then sends its response in the form of a transaction message 200 back to the control component 40, which transforms the response into a client format and forwards it to the requesting client.

Figure 3:
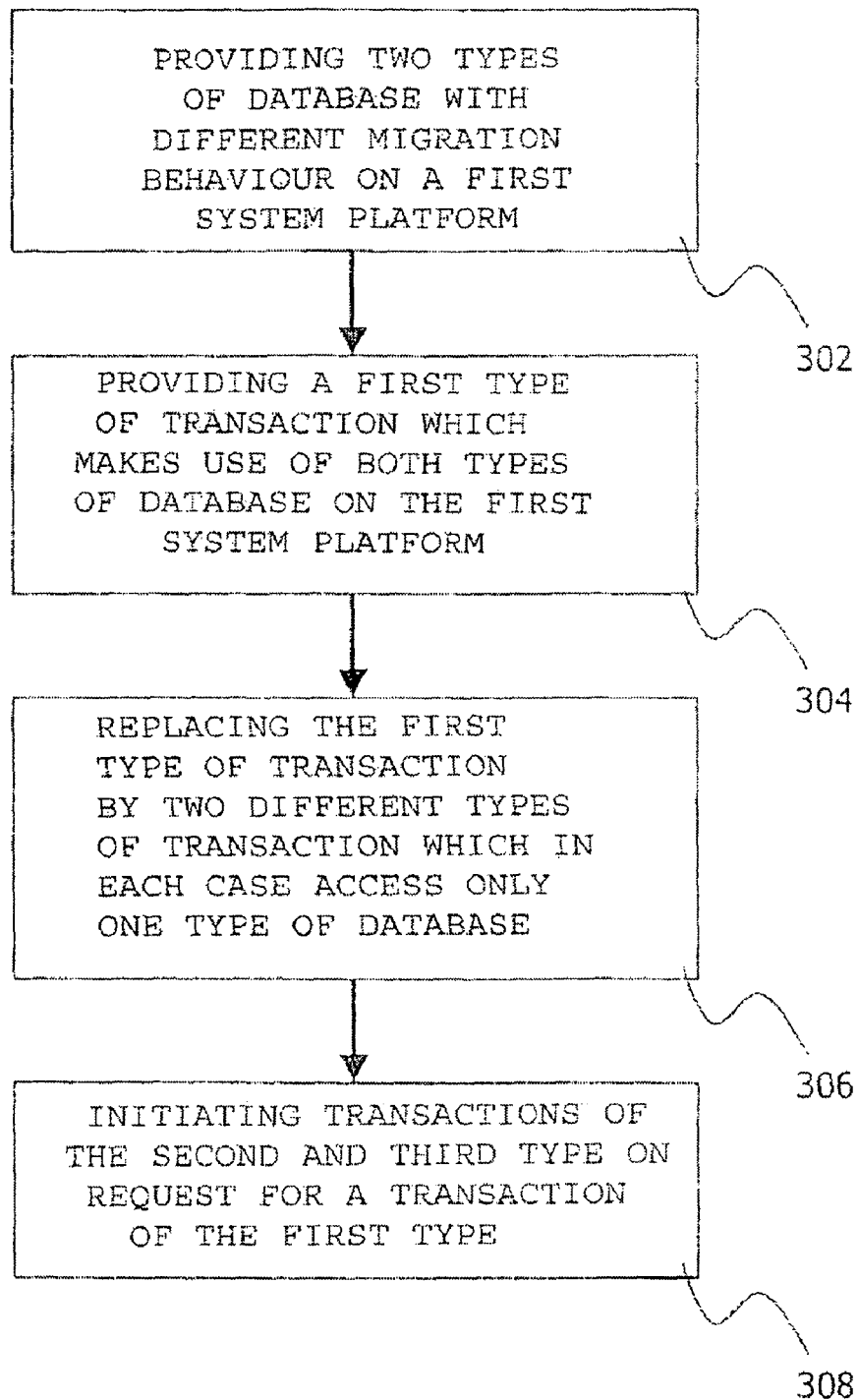
FIG. 3 shows a flow diagram of an embodiment of the configuration method according to the invention for preparing a migration to a new system platform.

FIG. 3 shows a flow diagram 300 of an embodiment of a method for configuring the transaction-based host environment 12 illustrated in FIG. 1 (or a host environment configured in some other way) for migration to a new system platform.

The method begins in step 302 with providing two types of database 20, 22 with different migration behaviour on a first system platform. The different migration behaviour of the two types of database 20, 22 results from the fact, for example, that the first type of database can be migrated fully or very largely automatically (possibly by machine translation, retaining the content and/or logical data model), while the second type of database 22 cannot be migrated very largely automatically (possibly because changes in content or a change in the logical data model are required).

In step 304 a first type of transaction 32 is provided which makes use of both types of database 20, 22 on the first system platform. Steps 302 and 304 substantially designate a certain state of the host environment 12 and can therefore be conducted in any order or else simultaneously.

In a further step 306 the first type of transaction 32 is replaced by two different types of transaction 34, 36, which in each case access only one single one of the two types of database 20, 22. In the example according to FIG. 1, the second type of transaction 34 makes use of the first database 20 only and the third type of database 36 accesses the second database 22 only.

In a concluding step 308, on request for a transaction of the first type 32 on the part of one or more of the clients 42 transactions of the second and third type 34, 36 are initiated, which replace or "simulate" the requested transaction of the first type 32 in the host environment.

Initiating the transactions of the second and third type 34, 36 can be done by means of the control component 40, for example. This situation is shown in FIG. 4, which shows the OLTP system according to FIG. 1 in a state ready for migration.

Figure 4:
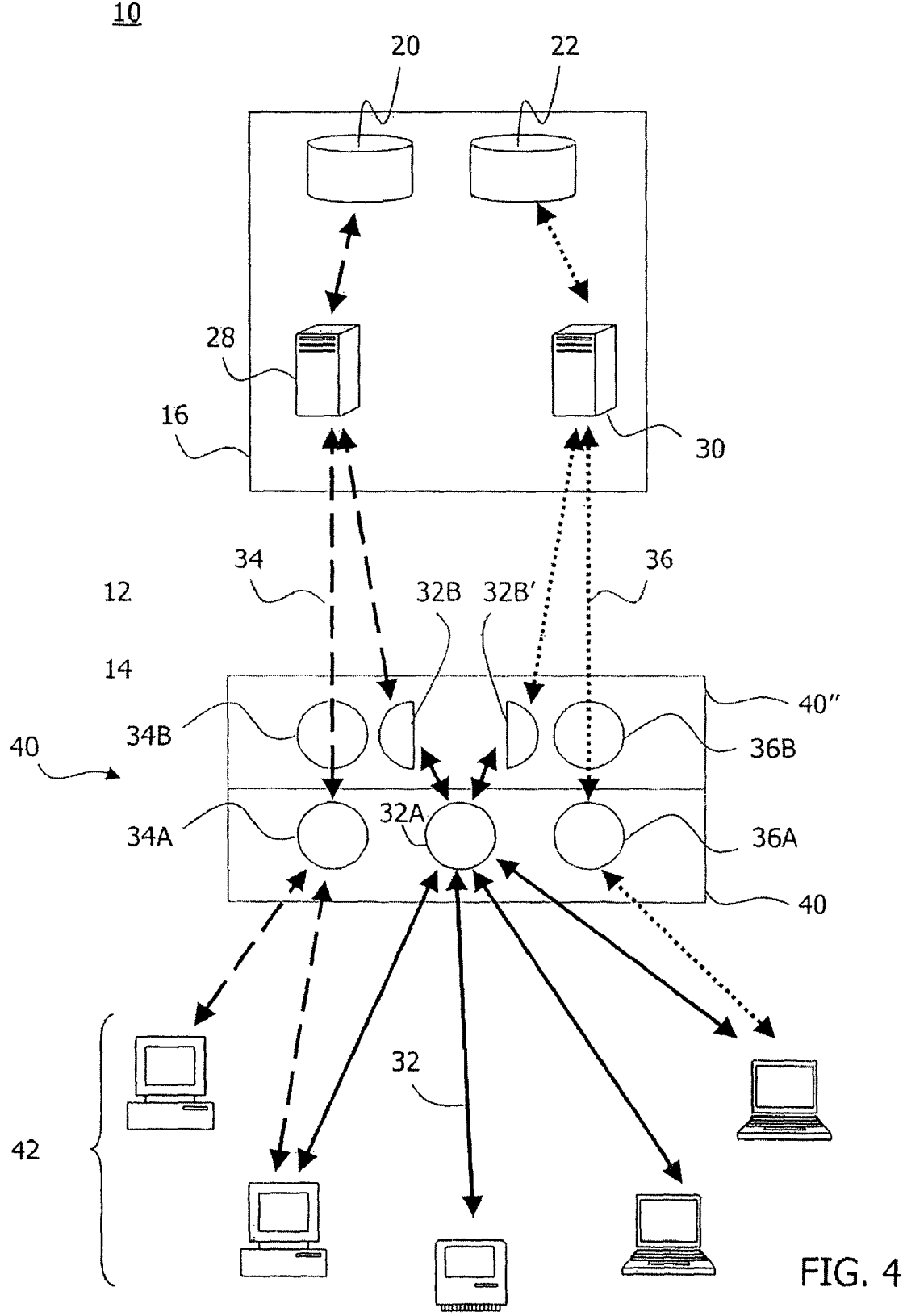
FIG. 4 shows a schematic illustration of the OLTP system configured according to the invention immediately before the beginning of the migration phase.

As can be seen from FIG. 4, the first type of transaction 32 is replaced in the host environment 12 by the second type of transaction 34 and the third type of transaction 36. In other words, the first type of transaction 32 is simulated in the host environment 12 by transactions of the second and third type 34, 36. With the omission of the first type of transaction 32 in the host environment there is also no need for the first type of application 26 (FIG. 1). Each application of the first type 26 is replaced by one (rewritten) application each of the second and third type 28, 30 and accordingly addressed by transactions of the second and third type 34, 36.

As the clients 42 in the decentralised environment 14 should not be influenced by the preparation of the host environment 12 for migration to a new system platform (and therefore will continue to request transactions of the first type 32), the control component 40 is supplemented by an additional layer. The transaction control mechanisms 32A, 34A, 36A already explained with reference to FIG. 1 are retained on a lower control layer 40'. However, an upper control layer 40" is now additionally introduced, which initiates allocated transactions of the second and third type 34, 36 on request for a transaction of the first type 32. For this purpose two transaction control mechanisms 32B, 32B' communicating with control mechanism 32A are provided in the control layer 40".

The control mechanisms 32B, 32B' initiate automatically allocated transactions of the second and third type 34, 36 on request for a transaction of the first type 32 by one of the clients 42. The newly initiated transactions of the second and third type 34, 36 have in totality the same effect in the host environment 12 as the requested transaction of the first type 32.

As emerges from FIG. 4, control mechanism 32B communicates with one or more applications of the second type 28 and control mechanism 32B' with one or more applications of the third type 30. As already mentioned, these applications normally have to be rewritten in the host environment 12 after dropping out of the applications of the first type 26. This applies in any case to those applications of the third type 30 of which the "new" transactions of the third type 36, which simulate the transactions of the first type 32 in the host environment 12, make use.

In the upper control layer 40" further control mechanisms 34B, 36B are implemented in addition to control mechanisms 32B, 32B' for initiating transactions of the second and third type 34, 36. However, in the present embodiment these control mechanisms 34B, 36B have no particular functionality. Rather, they forward transaction messages received from the control mechanisms 34A, 36A arranged below them without an additional editing step to the associated applications of the second and third type 28, 30.

Replacing transactions of the first type 32 by transactions of the second and third type 34, 36 requires the construction of an allocation between a transaction of the first type 32 requested by a client 42 and the thereupon initiated transactions of the second and third type 34, 36. Therefore in particular the control component 40 has to have a "memory" to this effect, so that the contents of the transaction messages received by the host 16 in connection with the transactions of the second and third type 34, 36 can be allocated to the requested transaction of the first type 32 and passed to the requesting client 42 in a suitable format.

For this purpose the control component 40 has a functionality for receiving results of transactions of the second and third type 34, 36 allocated to one another and for converting the received results into a predefined results format comprehensible to the requesting client. This functionality is based on the allocation between the requested transaction of the first type 32 and the thereupon initiated transactions of the second and third type 34, 36. This allocation can be done in table form, as illustrated in FIG. 5. Each transaction has a unique transaction number, so the transaction numbers of transactions allocated to one another can be placed in relationship with one another in one line of the table 500 in each case.

For example, the first line of the table 500 states that a transaction of the first type 32 with transaction number 1001 has been requested from the decentralised environment 14. Thereupon a single transaction of the second type 34 with transaction number 2001 has been initiated by control mechanism 32B and two transactions of the third type 36 with transaction numbers 3001 and 3002 by control mechanism 32B'. In the host environment 12 the requested transaction with transaction number 1001 is consequently "simulated" by in total three transactions with transaction numbers 2001, 3001 and 3002. As soon as the control component 40 establishes that there are transaction messages from the host 16 for the transactions with transaction numbers 2001, 3001 and 3002, the control component 40 knows that a "replacement transaction" corresponding to the requested transactions with transaction number 1001 has been fully conducted in the host environment 12. Based on the results contained in the three transaction messages received, a message is thereupon generated by the control component 40 for the client 42 who requested the transaction of the first type 32 with transaction number 1001.

Figure 6:
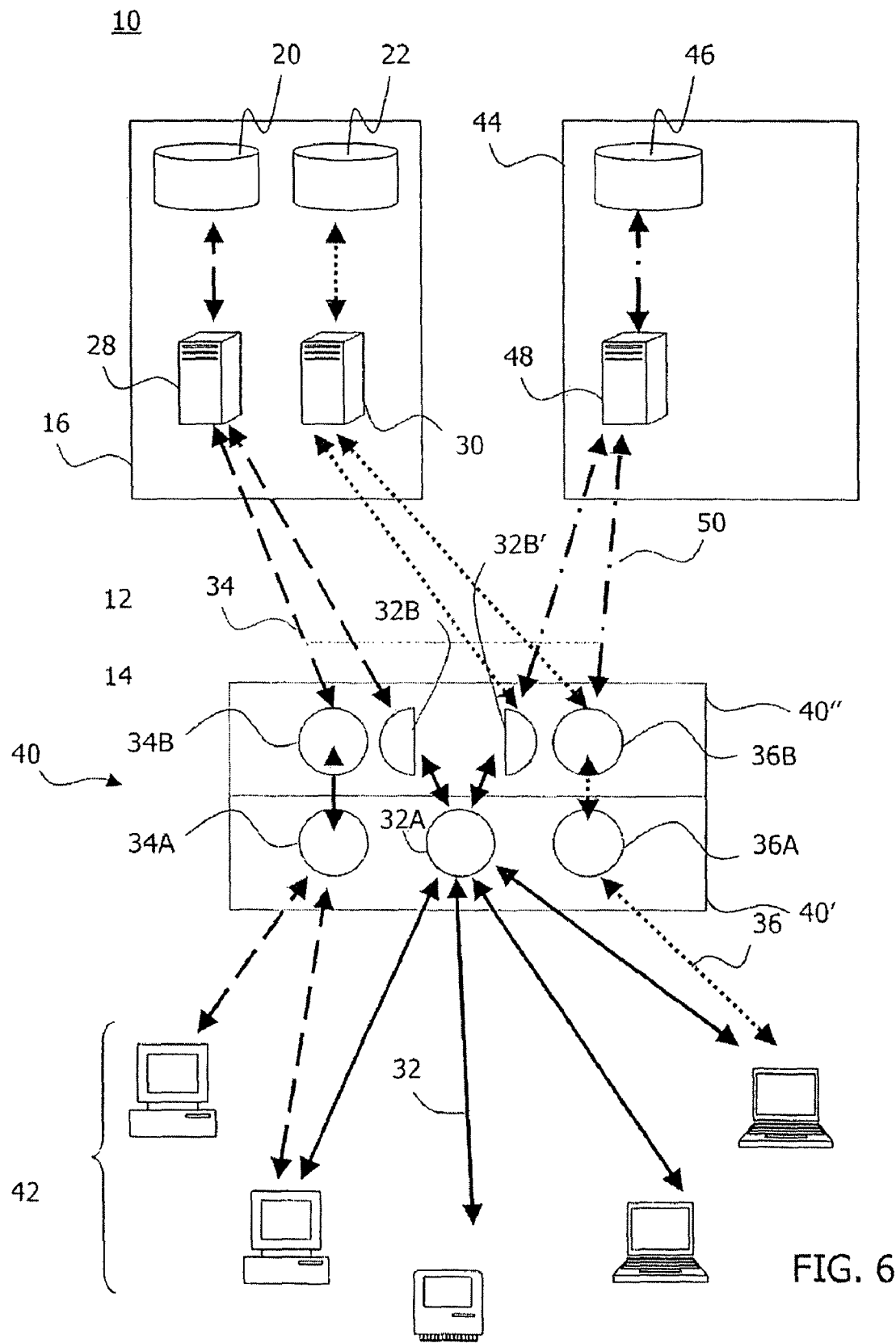
FIG. 6 shows a schematic illustration of the OLTP system according to the invention during the migration phase and with simultaneous keeping of data on the new and the previous system platform.

As can be seen from FIG. 5, a transaction of a fourth type of transaction with transaction number 4002 is allocated to a further transaction 1002 of the first type 32. Transactions of the fourth type are already running on the new system platform. This situation is illustrated in FIG. 6.

After configuration of the host environment 12 and the decentralised environment 14 as explained above, the migration of the host 16 to the new system platform (e.g. an IBM zOS platform with an IBM CICS transaction environment based thereon) can begin.

In the present embodiment, migration of the host 16 is done step by step. For this firstly a new host 44 with new host sub-components is taken into operation on the new system platform. A third database 46 of a third type is one of these new host sub-components. The third database 46 has common features in terms of content with the second database 22 on the previous system platform, but is modified in a structural respect in comparison with this second database 22 (therefore has, e.g. a different logical data model). As the third database 46 no longer coincides structurally with the second database 22, the applications of the third type 30 cannot be taken over on to the new system platform. Instead it is necessary to create applications of a fourth type 48 for the host 44. These applications of the fourth type 48 access the third database 46. In addition to the transactions of the second and third type 34, 36, which concern only the previous system platform, transactions of a fourth type 50 are additionally also provided (indicated by dot and dash arrows). The transactions of the fourth type 50 make use of the applications of the fourth type 48 on the new system platform and therefore also of the third type of database.

The databases of the previous host 16 and the new host 44 are at first co-existent during the migration phase. Administering the databases of the two hosts 16, 44 requires fanning out of the transactions of the first type 32 requested in the decentralised environment on both platforms. The control component 40 in the embodiment here splits a requested transaction of the first type 32 either into allocated transactions of the second and third type 34, 36 on the previous system platform or into allocated transactions of the fourth type 50 on the new system platform and (if necessary) of the second type 34 on the old system platform. The transactions of the fourth type 50 can be interpreted as "sister transactions" of the transactions of the third type 36, as both types of transaction 36, 50 have at least similar effects at database level.

The decision as to whether a requested transaction of the first type 32 should be split into transactions of the third and (if necessary) of the second type 34, 36 or into transactions of the fourth (and if necessary) of the second type 34, 50 can be based on different criteria. It is conceivable, for example, to conduct the migration of the content of the database in tranches and to conduct the decision as a function of the migration status of the tranche to which a requested transaction of the first type 34 relates. An example to this effect is explained in greater detail below in connection with FIG. 9.

The transactions of the third and fourth type 32, 50 are advantageously based on transaction messages of identical format. The applications of the fourth type 48 are additionally written in such a way that they can likewise interpret and process the transaction messages previously used in connection with the transactions of the third type 36. This approach contributes appreciably to avoiding problems during migration, as the message syntax can also be retained after migration and the control component 40 therefore needs only slight modification.

Allocation of the individual transactions to one another is also done after the migration phase has started by means of the table 500 illustrated in FIG. 5. For this the column provided for the fourth type of transaction 50 is supplemented by the transaction numbers of the transactions of the fourth type 50 initiated by the control component 40 in response to the request for transactions of the first type 32. This means, for example, that for the requested transaction of the first type 32 with transaction number 1002, additionally to a transaction of the second type 34 with transaction number 2001, a transaction of the fourth type 50 with transaction number 4001 is initiated. Transactions of the third type 36 are not initiated for transaction of the first type 32 with transaction number 1002, on the other hand.

In the example illustrated in FIG. 5, a transaction of the second type 34 and in addition either transactions of the third type 36 (as shown for the transaction of the first type 32 with transaction number 1001) or a transaction of the fourth type 50 (as shown for the transaction of the first type 32 with transaction number 1002) are always initiated for a requested transaction of the first type 32. Initiating the transactions of the third and fourth type 36, 50 is done by the control mechanisms 32B' and 36B.

Figure 7:
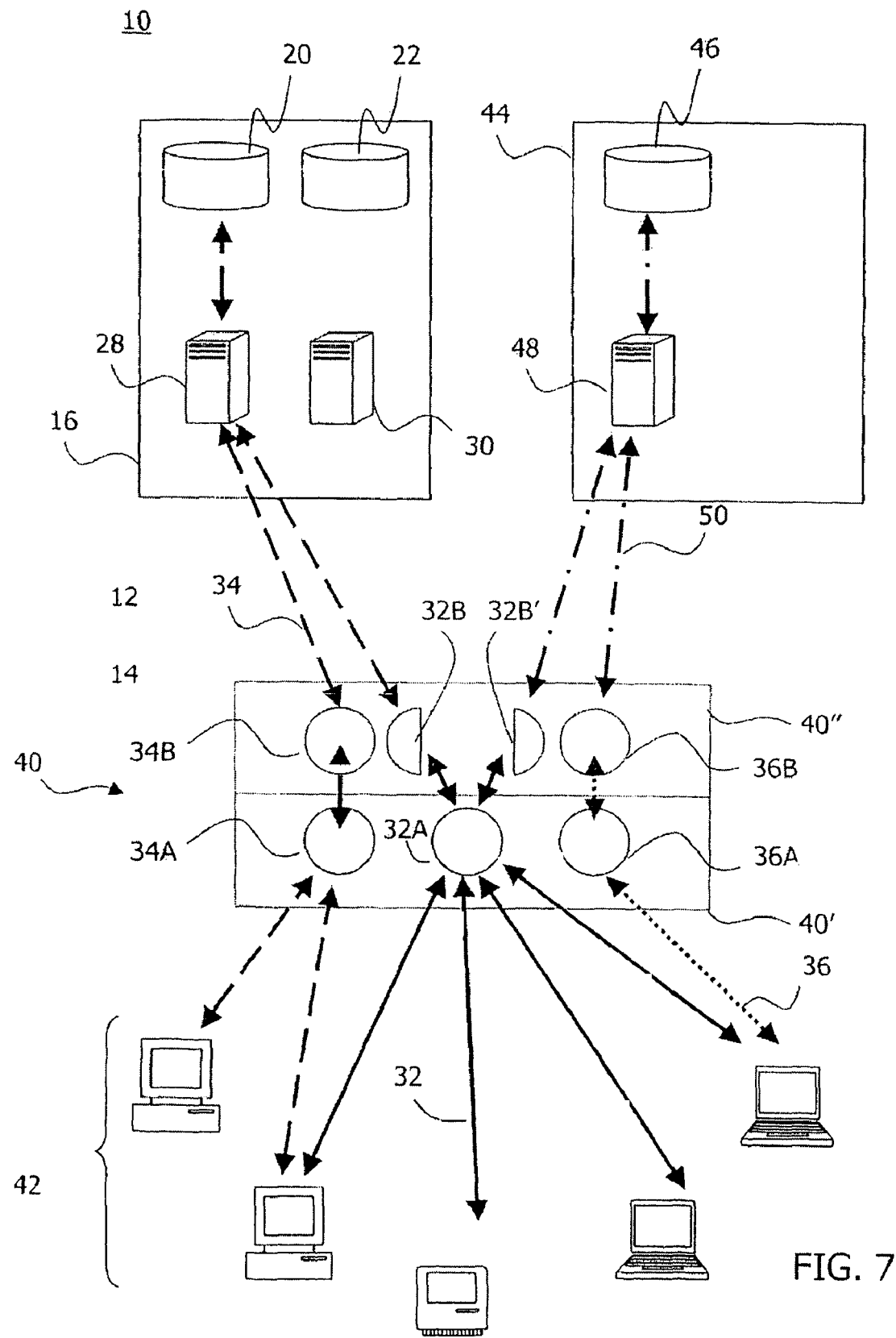
FIG. 7 shows a schematic illustration of the OLTP system according to the invention during the migration phase and with partially carried out transition to the new system platform.

FIG. 7 shows the OLTP system 10 after discontinuing the transactions of the third type 36. The control mechanisms 32B' and 36B are now configured in such a way that only transactions of the fourth type 50 are now initiated for a requested transaction of the first type 32. The control mechanisms 32B and 34B, on the other hand, still continue to initiate transactions of the second type 34.

After transactions of the third type 36 have been discontinued (or even before), the first database 20 can be migrated with the associated type of application 28 to the new system platform. In the example it is assumed that the first database 20 is taken over on to the new system platform without changing the logical data model (and therefore at least largely automatically). For this reason the applications of the second type of application 28 accessing only the first database 20 do not have to be rewritten for the new system platform. Instead migration of the applications of the second type of application 28 requires only a code translation (that can at least largely be automated) to the new system platform. This situation is now explained in greater detail with reference to FIG. 8.

Figure 8:
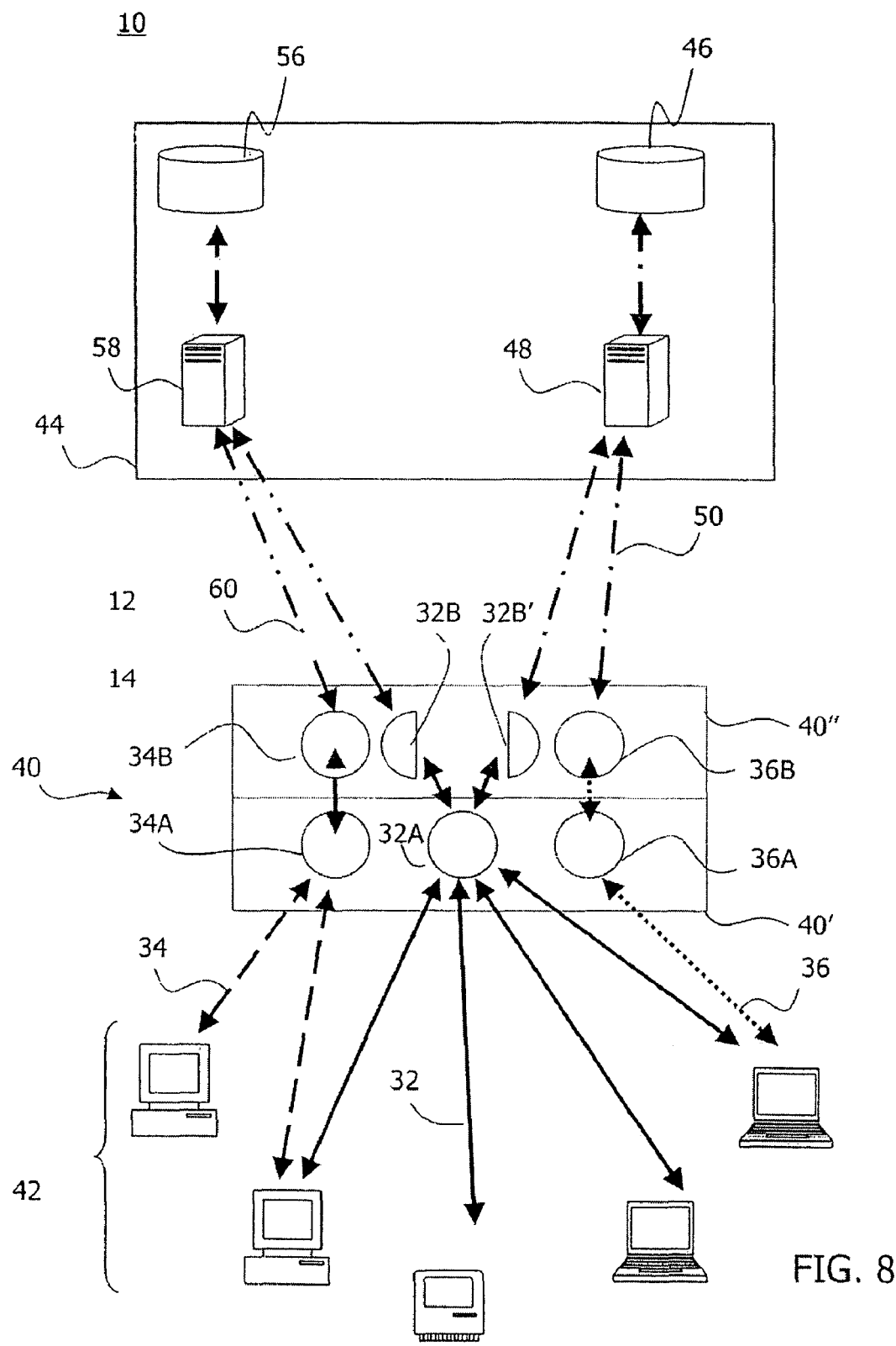
FIG. 8 shows a schematic illustration of the OLTP system according to the invention after completion of the migration phase.

FIG. 8 shows the fully migrated OLTP system 10. The host 44 on the new system platform now comprises in addition to the third database 46 and the associated fourth type of application 48 a fourth database 56, which corresponds structurally to the first database 20 on the previous system platform. Applications of a fifth type of application 58, which has been generated by code translation from the applications of the second type of application 28, access the fourth database 56. Transactions of a fifth type 60 (indicated by dot and dash arrows with double dots) replace the transactions of the second type 34 used to date. The transactions of the fifth type 60 make use of applications of the fifth type of application 58 and of the fourth database 56.

Figure 9:
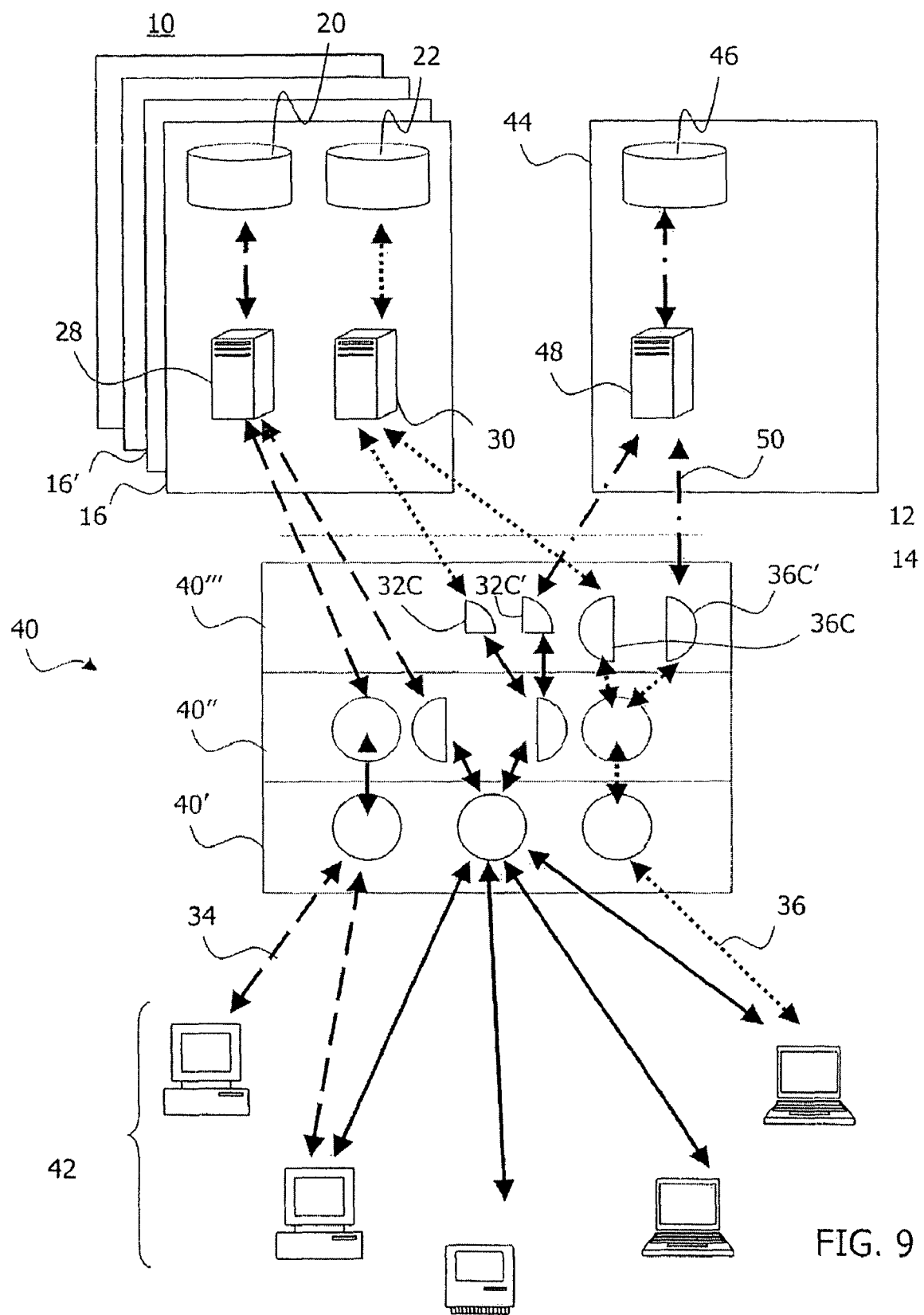
FIG. 9 shows a schematic illustration of a further OLTP system configured according to the invention during the migration phase.

FIG. 9 shows an embodiment of tranche-by-tranche migration of an OLTP system 10 to a new system platform. In the embodiment example illustrated in FIG. 9 a plurality of parallel hosts 16, 16', etc. is provided on the previous system platform. The migration status of the OLTP system 10 according to FIG. 9 corresponds to the migration status of the OLTP system illustrated in FIG. 6.

Each of the hosts 16, 16', etc. on the old system platform has similar host sub-components and in particular similar applications. The hosts 16, 16', etc. differ only in respect of the content of the individual databases 20, 22. The different database contents therefore result in each host 16, 16', etc. processing data sets of different entity groups. For instance, host 16 could take care of data sets of entity groups 001 to 010 and host 16' data sets of entity groups 011 to 020, etc. Each entity group consists of a multiplicity of different entities for which data sets are kept in the individual databases.

If one of the clients 42 in the decentralised environment 14 requests a certain type of transaction for the data set of a certain entity, the control component 40 identifies the entity associated with the requested transaction and sends a transaction message to the host 16, 16', etc. which manages the entity group to which the entity identified by the control component 40 belongs.

The multiplicity of individual hosts 16, 16', etc. on the previous system platform is replaced by a single host 44 on the new system platform. This is also advantageous because the code duplication of the applications running on the parallel hosts 16, 16', etc., which requires a high maintenance outlay, is therefore avoided. In addition, the number of separate databases can be drastically reduced.

After the database 46 and the type of application 48 have been taken into operation on the new system platform, migration of the entities to the new system platform takes place tranche by tranche. This means, for example, for host 16 that some entity groups it takes care of (in any case as far as the third type of transaction 36 is concerned) are migrated to the new system platform. The control component 40 naturally needs to know whether a certain entity for which a transaction has been requested is being taken care of by one of the previous hosts 16, 16', etc. or by the new host 44. The control component 40 therefore, according to FIG. 9, comprises a third, top control layer 40''' with knowledge of the migration status of the individual entities (or entity groups).

In the third control layer 40''', among other things, two control mechanisms 32C, 32C' are implemented, which communicate with the control mechanism 32B' imbedded in the second control layer 40'' and two further control mechanisms 36C, 36C', which communicate with the control mechanism 36B arranged in the third control layer 40''. The control mechanisms 32C, 32C', 36C, 36C' in the third control layer 40''' determine the entity (or entity group) allocated to a requested transaction of the first type 32 and the migration status of this entity. The migration status of the individual entities (or entity groups) can be registered for example in table form.

After the migration status of an entity on which the requested transaction is based has been determined, a transaction of the third type 36 is conducted on the previous system platform in control layer 40''' as a function of the determined migration status or a transaction of the fourth type 50 on the new system platform. In FIG. 5 the transaction of the first type 32 with transaction number 1001 therefore relates to an entity which has not yet been migrated (as no transaction of the fourth type 50 is allocated to this transaction), while the transaction of the first type 32 with transaction number 1002 relates to an already migrated entity (which is why a transaction of the fourth type 50 with transaction number 4002 has been initiated).

Insofar as a transaction of the third type 36 is to be conducted, it is additionally determined in control layer 40''' (or one of the control layers 40', 40" located beneath it) which of the hosts 16, 16', etc. takes care of the entity group to which the determined entity belongs. The associated transaction message is subsequently sent to the host 16, 16', etc. responsible.

As has emerged from the preceding description of preferred embodiments, the migration approach according to the invention has a series of advantages. It should firstly be stressed that the migration of the host environment has no effects on the decentralised environment, apart from the optional control component. The heterogeneous clients in the decentralised environment therefore do not require e.g. a software update in order to be able to continue to request all the previous types of transaction even after migration. The decentralised environment therefore remains stable and even the message syntax can be retained in the decentralised environment. Of further advantage is the fact that the migration can be done step by step. In particular the entire database environment does not have to be taken into operation ad hoc on the new system platform. It should further be stressed that the approach according to the invention also supports parallel operation of hosts on the previous and on the new system platform.

It will be apparent to one of ordinary skill in the art that numerous modifications and substitutions may be made without departing from the spirit of the invention. Accordingly, the invention has been described by way of illustration rather than limitation, and is limited only by the appended claims.

The invention claimed is:

1. A method for configuring a transaction-based host environment for the migration from a first system platform to a second system platform, wherein access to the host environment from a decentralised environment is maintained during the migration, comprising the steps:
   providing at least one database of a first type on the first system platform, wherein the first type of database is not migrated to the second system platform or is migrated at least one of unchanged in content and with an unchanged logical data model;
   providing at least one database of a second type on the first system platform, wherein on migration to the second system platform the second type of database is transformed into a third type of database that is at least one of changed in content and changed in relation to a logical data model;
   replacing, during the migration a first type of transaction, which on the first system platform accessed both the first type of database and the second type of database, by a second type of transaction and a third type of transaction in the host environment, wherein the second type of transaction accesses the first type of database and not the second type of database, and the third type of transaction accesses the second type of database and not the first type of database;
   receiving a request for a transaction of the first type from the decentralized environment;
   in response to receipt of the request during the migration, initiating transactions of the second and third type in the host environment; and
   upon completion of the migration of the second type of database to the third type of database the method further comprising the steps of:
      replacing the first type of transaction with a first post migration type of transaction and a second post migration type of transaction, wherein the first post migration type of transaction accesses the first type of database and not the second or third types of databases, and the second post migration type of transaction accesses the third type of database and not the first or second types of databases;
      in response to receipt of the request after the migration, initiating transactions of the first and second post migrations types in the host environment; and
      disabling the second type of database from the host environment.

2. The method according to claim 1, comprising the further step of generating an allocation between a requested transaction of the first type and one each of an initiated transaction of the second and the third type.

3. The method according to claim 2, comprising the further steps:
   receiving results of transactions of the second and third type allocated to one another; and
   converting the received results into a pre-defined result format of the requested transaction of the first type.

4. The method according to claim 3, comprising the further steps:
   requesting the transaction of the first type by a client in the decentralised environment; and
   passing the converted result to the requesting client.

5. The method according to claim 3, wherein at least one of the steps of generating the allocation, receiving results and converting the results is performed the decentralised environment.

6. The method according to claim 1, comprising the further-step:
   determining a status of the migration.

7. The method according to claim 6, wherein migration of the content of the database of the second type is done tranche by tranche; and wherein in the step of determining a check is made as to whether the requested transaction of the first type relates to an already migrated tranche.

8. The method according to claim 1, comprising the further step of taking into operation at least one database of a fourth type of database which has arisen from the first type of database on the second system platform.

9. The method according to claim 8, comprising the further step of taking into operation an application accessing the fourth type of database on the second system platform, wherein the application has been obtained by code translation from an application running on the first system platform and there accessing the first type of database.

10. The method according to claim 1, wherein the transactions relate to data sets, allocated in each case to an entity, and migration is conducted entity by entity.

11. The method according to claim 10, comprising the further step of providing a plurality of parallel hosts with similar transaction behavior on the first system platform, wherein a subset of the entities is allocated to each host.

12. The method according to claim 11, wherein the functionalities of the plurality of parallel hosts on the first system platform are taken on by a single logical host on the second system platform.

13. The method according to claim 10, comprising the further steps:
   determining the entity allocated to a requested transaction of the first type;
   determining the migration status of the allocated entity;
   conducting the allocated transaction of the third type on the first system platform or the allocated transaction of a fourth type on the second system platform as a function of the migration status of the allocated entity.

14. The method according to claim 13, wherein the determining steps are conducted in the decentralised environment.

15. The method according to claim 13, wherein the migration status is determined using a table.

16. A transaction control component in a terminal controller in a decentralized computer environment for configuring a transaction-based host environment for migration from a first system platform to a second system platform, with access to the host environment from the decentralised environment, comprising:

a memory for storing computer executable instructions;

a processing unit for accessing the memory and executing computer executable instructions; and a control mechanism having computer executable instructions stored in memory that when executed, are configured to:

initiate transactions of a second and a third type during the migration in response to receiving a request for a transaction of a first type from the decentralised environment, wherein the first type of transaction accessed both a first type of database and a second type of database on the first system platform and the second type of transaction accesses the first type of database and not the second type of database, and the third type of transaction accesses the second type of database and not the first type of database, and wherein the first type of database and the second type of database have different migration behavior;

upon completion of the migration of the second type of database to a third type of database on the second platform, initiate transactions of a first and second post migration types in response to receiving a request for a transaction of the first type from the decentralised environment, wherein the first post migration type of transaction accesses the first type of database and not the second type of database or the third type of database, and the second type of transaction accesses the third type of database and not the first type of database or the second type of database, and wherein the third type of database corresponds to the second database transformed with at least one of changed content and a changed relation to a logical model; and disabling the second database from the host environment.

17. A decentralised client system with access to a host environment and containing the transaction control component according to claim 16, wherein access to the host environment is done via the transaction control component.

18. The client system according to claim 17, wherein transactions of the first type are requested by the client system irrespective of the migration status of the host environment.

* * * * *